United States Patent
Kuntagod et al.

(10) Patent No.: US 10,049,361 B2
(45) Date of Patent: Aug. 14, 2018

(54) DYNAMIC AUTHENTICATION TECHNOLOGY

(71) Applicant: ACCENTURE GLOBAL SERVICES LIMITED, Dublin (IE)

(72) Inventors: Nataraj Subbaraya Kuntagod, Bangalore (IN); Sanjoy Paul, Bangalore (IN); Swapnajeet G. Chodhury, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 506 days.

(21) Appl. No.: 13/764,720

(22) Filed: Feb. 11, 2013

(65) Prior Publication Data

US 2014/0172707 A1    Jun. 19, 2014

(30) Foreign Application Priority Data

Dec. 14, 2012  (IN) .......................... 5223/CHE/2012

(51) Int. Cl.
*G06Q 20/00* (2012.01)
*G06Q 20/40* (2012.01)
*G06Q 20/32* (2012.01)

(52) U.S. Cl.
CPC ... *G06Q 20/40145* (2013.01); *G06Q 20/3224* (2013.01); *G06Q 20/40* (2013.01); *G06Q 20/405* (2013.01); *G06Q 20/4016* (2013.01)

(58) Field of Classification Search
CPC ...... G06Q 20/04; G06Q 20/27; G06Q 20/105; G06Q 20/382; G06Q 20/322; G06Q 20/855; G06Q 20/3278

USPC .......................................................... 705/64
See application file for complete search history.

(56) References Cited

U.S. PATENT DOCUMENTS

| | | | |
|---|---|---|---|
| 5,819,226 A * | 10/1998 | Gopinathan | G06Q 20/00 705/44 |
| 8,255,698 B2 | 8/2012 | Li et al. | |
| 9,053,374 B2 * | 6/2015 | Partington | G06F 17/30979 |
| 2003/0154406 A1 * | 8/2003 | Honarvar et al. | 713/201 |
| 2009/0199264 A1 * | 8/2009 | Lang | 726/1 |

(Continued)

FOREIGN PATENT DOCUMENTS

| WO | WO 2005/031633 | 4/2005 |
|---|---|---|
| WO | WO2010082960 A1 | 7/2010 |

OTHER PUBLICATIONS

NPL Search Report for U.S. Appl. No. 13/764,720, Searched by EIC, dated May 18, 2018.*

(Continued)

*Primary Examiner* — Hai Tran

(74) *Attorney, Agent, or Firm* — Fish & Richardson P.C.

(57) ABSTRACT

A request to perform a transaction is detected. Based on the request to perform the transaction, one or more factors related to a context in which the transaction is being requested are determined. Based on the one or more factors, one or more parameters for authenticating a user that requested performance of the transaction are determined. The user that requested performance of the transaction is authenticated based on the determined one or more parameters for authenticating the user that requested performance of the transaction. Based on to authenticating the user that requested performance of the transaction, performance of the requested transaction is allowed.

20 Claims, 10 Drawing Sheets

(56) References Cited

U.S. PATENT DOCUMENTS

| | | | |
|---|---|---|---|
| 2009/0319425 A1* | 12/2009 | Tumminaro et al. .......... 705/42 |
| 2013/0083975 A1* | 4/2013 | Partington ........ G06F 17/30979 |
| | | | 382/115 |
| 2014/0337243 A1* | 11/2014 | Dutt ..................... G06Q 50/265 |
| | | | 705/325 |
| 2015/0073987 A1* | 3/2015 | Dutt .................. G06Q 20/4016 |
| | | | 705/44 |

OTHER PUBLICATIONS

Extended European Search Report for Application No. 13197165.7-1955 dated Apr. 3, 2014, 6 pages.
Office Action in AU Application No. 2013270621, dated Jul. 22, 2014, 3 pages.
Office Action in Au Application No. 2013270621, dated Nov. 4, 2014, 2 pages.
European Office Action in Application No. 13197165.7, dated Aug. 2, 2016, 6 pages.

* cited by examiner

DYNAMIC AUTHENTICATION TECHNOLOGY

CROSS-REFERENCE TO RELATED APPLICATIONS

The present application claims the benefit of Indian Patent Application No. 5223/CHE/2012, filed on Dec. 14, 2012, which is incorporated herein by reference in its entirety for all purposes.

This disclosure relates to authentication technology.

BACKGROUND

A typical biometric authentication system includes a database of biometric information (e.g., fingerprints, retina scans, facial images, etc.) about individuals. To identify or authenticate a sample of biometric information, the typical biometric matching system compares the sample with entries in the database.

SUMMARY

In one aspect, a system includes at least one processor and at least one memory coupled to the at least one processor having stored thereon instructions which, when executed by the at least one processor, causes the at least one processor to perform operations. The operations include detecting a request to perform a transaction; determining, based on the request to perform the transaction, one or more factors related to a context in which the transaction is being requested; determining, based on the one or more factors, one or more parameters for authenticating a user that requested performance of the transaction; authenticating the user that requested performance of the transaction based on the determined one or more parameters for authenticating the user that requested performance of the transaction; and based on authenticating the user that requested performance of the transaction, allowing for performance of the requested transaction.

In another aspect, a method may include one or more of the operations described above. In yet another aspect, a computer-readable storage medium may be operable to cause a processor to perform one or more of the operations described above.

Implementations may include one or more of the following features. For example, the operations may further include determining a type of the transaction; identifying a rule set that corresponds to the type of the transaction; and determining, based on the identified rule set, the one or more factors related to a context in which the transaction is being requested.

The operations may further include determining, based on the identified rule set, the one or more parameters for authenticating a user that requested performance of the transaction.

The operations may further include determining a type of the transaction; selecting at least one rule corresponding to the determined type of the transaction; and identifying, based on the at least one rule, the one or more factors related to a context in which the transaction is being requested.

The operations may further include evaluating the one or more factors against evaluation criteria that specify different levels of authentication to perform in authenticating the transaction depending on the context in which the transaction is being requested; and determining the one or more parameters for authenticating a user that requested performance of the transaction based on evaluating the one or more factors against the evaluation criteria.

The operations may further include determining one or more parameters that define one or more modes of authentication that are used in authenticating the user that requested performance of the transaction.

The operations may further include determining one or more parameters that define a sensitivity used modes of authentication.

The operations may further include obtaining one or more global factors related to a context in which the transaction is being requested, the one or more global factors being related to multiple transactions of multiple users that have occurred throughout the system; evaluating the one or more global factors based on against the evaluation criteria; and determining the one or more parameters for authenticating a user that requested performance of the transaction based on evaluating, against the evaluation criteria, the one or more local factors and the one or more global factors.

The one or more factors include one or more factors describing a history of transactions of the user that requested performance of the transaction, a type of the transaction, a timing of the transaction, a geographic location of the transaction, or at least one environmental factor related to an ability to authenticate the user using biometric authentication techniques.

The one or more global factors include a history of transactions that have occurred throughout the system, timings of the transactions that have occurred throughout the system, monetary amounts of the transactions that have occurred throughout the system, or geographic locations of the transactions that have occurred throughout the system.

The evaluation criteria specifies, based on the one or more local factors and the one or more global factors, one or more modes of authentication, and wherein determining the one or more parameters for authenticating a user that requested performance of the transaction comprises determining one or more modes of authentication to use in authenticating the user that requested performance of the transaction.

The evaluation criteria specifies, based on the one or more local factors and the one or more global factors, one or more respective sensitivities for the one or more modes of authentication, and wherein determining the one or more parameters for authenticating a user that requested performance of the transaction comprises determining one or more respective sensitivities for the one or more modes of authentication to use in authenticating the user that requested performance of the transaction.

The transaction is a first transaction, and wherein the one or more parameters include a first mode of authentication and a first sensitivity for the first mode of authentication.

The operations may further include detecting a request to perform a second transaction; determining, based on the request to perform the second transaction, one or more second factors related to a context in which the transaction is being requested; determining, based on the one or more second factors, one or more second parameters for authenticating a user that requested performance of the transaction, wherein the one or more second parameters include the first mode of authentication, a second mode of authentication, and a second sensitivity for the first mode of authentication, wherein the second sensitivity is greater than the first sensitivity; authenticating the user that requested performance of the second transaction based on the determined one or more second parameters for authenticating the user that requested performance of the first transaction; and based on to authenticating the user that requested performance of the second transaction, allowing for performance of the requested second transaction.

The details of one or more implementations are set forth in the accompanying drawings and the description, below. Other potential features of the disclosure will be apparent from the description and drawings, and from the claims.

DETAILED DESCRIPTION

In some implementations, a dynamic authentication system leverages authentication (e.g., biometric recognition) technology and adjusts user authentication performed for a transaction based on a context in which a user requested the transaction. Authentication methods may be defined using one or more rule sets that each specify factors ("context factors") related to a context in which the transaction is being requested, evaluation criteria for evaluating the context factors, and parameters (e.g., modes of authentication, sensitivities of authentication modes, etc.) to be used based on the evaluation of the context factors.

As described below, a dynamic authentication system may dynamically adjust, for example, depending on the type of transaction requested, environmental factors at the transaction (e.g., lighting or noise conditions), transaction history, human factors, business data, and a geographic location of the transaction.

The dynamic authentication system also may dynamically adjust authentication methods based on a context in which the transaction is being requested by increasing or decreasing the number of modes of authentication that a user needs to satisfy. For instance, the system may require only a password for a first transaction that appears appropriate and would result in a relatively low level of harm if fraudulent. For a second transaction that appears suspicious and would result in a relatively high level of harm if fraudulent, the system may require a password, a facial recognition match, and a fingerprint match to enable performance of the second transaction.

The dynamic authentication system further may dynamically adjust authentication methods based on the context by increasing or decreasing respective sensitivities (e.g., thresholds or data that defines how close of a match is required to determine a match) for satisfying the selected modes of authentication, as described below in reference to FIG. 9. For example, if a user is being authenticated using face recognition and the lighting conditions in the user's environment are poor, then the dynamic authentication system may dynamically adjust the sensitivity for satisfying the face recognition so that the user can be authenticated even if the image capturing the user's facial features is of lesser quality. In this example, if other factors describing the context of the transaction indicate that the transaction is suspicious, the dynamic authentication system may not adjust the sensitivity for satisfying the face recognition, despite the poor lighting conditions.

Figure 1:
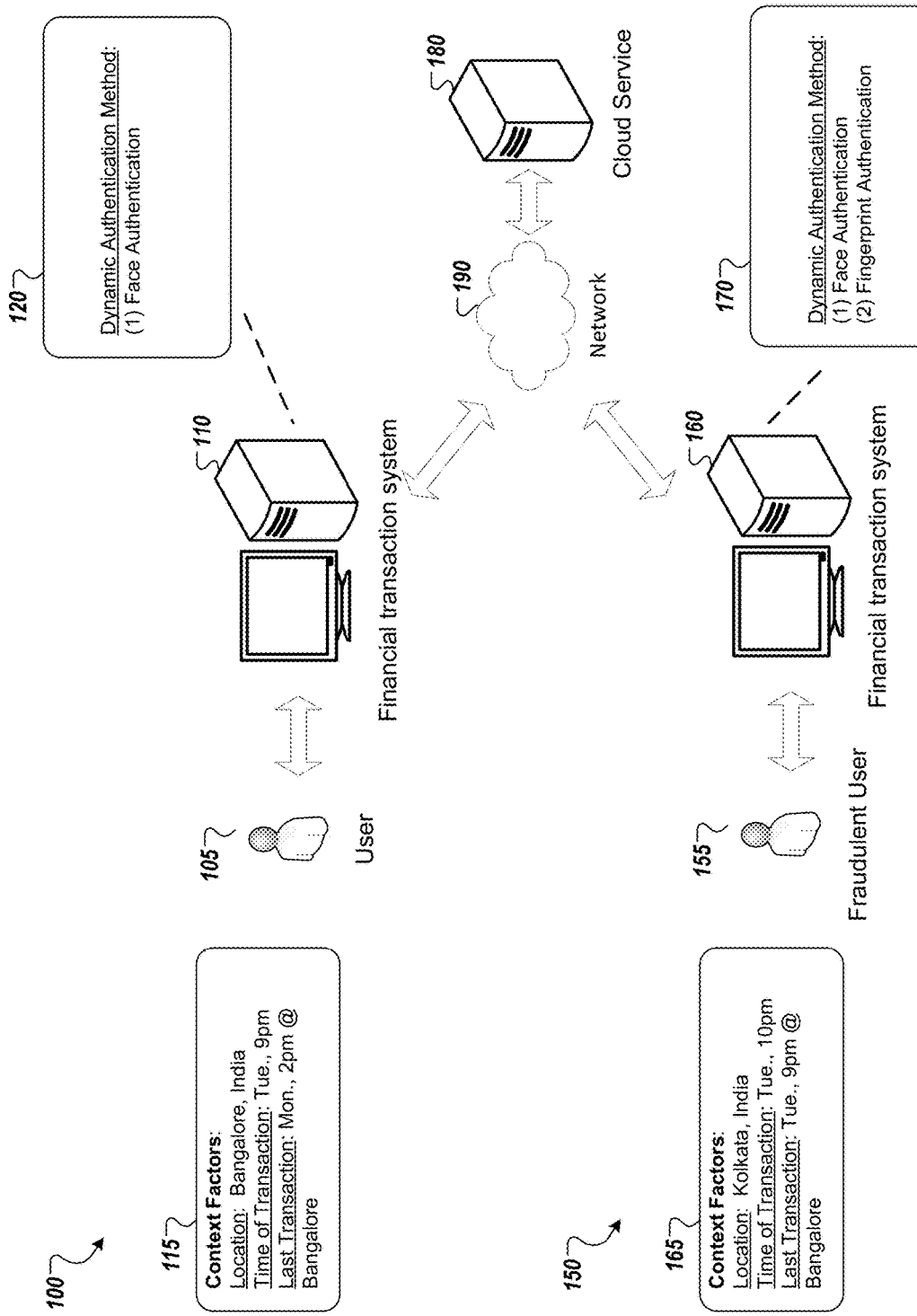
FIG. 1 illustrates an exemplary process for authenticating a user using a dynamic authentication method.

FIG. 1 illustrates example processes 100 and 150 for authenticating a user using a dynamic authentication method. As shown in process 100, a person 105 is interacting with a financial transaction system 110, e.g., an automated teller machine (ATM), to request one or more transactions, e.g., a cash withdrawal.

The financial transaction system 110 is configured to determine an authentication method for authenticating the person 105 based on evaluating one or more context factors 115, e.g., factors that relate to a person's environment in which a transaction is being requested. By evaluating the context factors 115, the system 110 can dynamically select an authentication method 120 that adjusts the level of security needed to authenticate the person 105. In some implementations, the one or more context factors serve as a first layer of authentication. In such implementations, the system 110 can determine whether subsequent levels of authentication are needed and their corresponding sensitivities based on results of evaluating the one or more context factors.

The system 110 can determine which context factors to evaluate by identifying, based on the type of transaction being requested, a rule set that specifies one or more context factors to evaluate.

Rule sets can be stored on the system 110 and/or provided by the cloud service 180. Each rule set can correspond to a particular transaction type and can specify, for that the transaction type, one or more context factors to be evaluated; evaluation criteria for evaluating the context factors, and one or more parameters. In some implementations, the rule sets are configured and provided by an organization (e.g., a bank).

In some implementations, the context factors include human factors, e.g., factors that measure a person's habits, mental state, or mood; a person's social environment, e.g., task-related activities; a person's physical environment, e.g., location, network connectivity, or battery life remaining on the person's mobile device; business data, e.g., goal-directed activities or trust; transaction details, e.g., transaction amounts (e.g., a withdrawal amount), transaction type, e.g., a cash withdrawal, timing of the transaction; and a geographic location of the transaction.

In some implementations, the parameters include particular modes of authentication for authenticating a person based on an evaluation of the one or more context factors. The parameters can also include respective sensitivities, e.g., thresholds, for satisfying the particular modes of authentication.

For example, if the person 105 is requesting a cash withdrawal transaction, the system 110 can identify a rule set that corresponds to cash withdrawal transactions. The identified rule set can specify as context factors transaction details, e.g., transaction amounts, types, timing, and geographic locations of the transactions. The rule set can also specify evaluation criteria for the context factors and respective parameters, e.g., modes of authentication and their corresponding sensitivities, to use based on the results of the evaluation.

For example, the rule set can specify that face recognition should be used as a mode of authentication to authenticate a user that has not requested a cash withdrawal within the last 20 minutes of the current transaction request. The rule set can also specify that both face recognition and fingerprint recognition should be used as modes of authentication to authenticate the user if the user has requested a cash withdrawal within the last 20 minutes. Thus, the perspective gathered can be used to determine the mode of authentication that is used for authentication. In addition, the rule set can specify weightings applied to different modes of authentication. For instance, in a noisy environment, the system 110 can give greater weight to a biometric face recognition mode of authentication and a lower weighting to a voice recognition mode of authentication. In an environment of low ambient light, the system 110 can give a greater weight to a biometric finger print recognition mode of authentication and a lower weighting to a face recognition mode of authentication.

Further, the rule set can specify sensitivities, e.g., thresholds, for satisfying the modes of authentication. For example, the rule set can specify a lower sensitivity for the face recognition mode of authentication based on the user's environmental factors, e.g., low light or bright light visibility. Similarly, the rule set can specify a lower sensitivity for a voice recognition mode of authentication based on the user's environmental factors, e.g., based on the user being in an environment with loud background noises.

In some implementations, the system 110 communicates with a cloud service 180 over a network 190, e.g., the Internet, to determine one or more context factors that relate to a global context in which the transaction is being requested. The global context can describe factors that relate to a global environment.

For example, the global context factors can include a history of transactions for each person throughout one or more geographic regions. The history of transactions can include, for example, types of the transactions made by a person, timings of the transactions made by a person, monetary amounts of the transactions made by a person, and geographic locations of the transactions made by a person.

Based on the identified rule set and on an evaluation of the one or more context factors, the system 110 can select parameters, e.g., modes of authentication, to be used for authenticating a person, as described above.

As shown in FIG. 1, the system 110 determines that the person 105 interacting with the system 110 is attempting a cash withdrawal and is located in Bangalore, India. For example, the system 110 can be associated with the location Bangalore, India, and can use that association to determine the person's location. In some implementations, the person's location is determined based on one or more geo-location sensors in the person's 105 mobile device.

The system 110 also determines a timing of the transaction request, e.g., Tuesday at 9 pm. Additionally, the system 110 communicates with the cloud service 180 to determine a timing of the last transaction request, e.g., Monday at 2 pm, that was submitted by the person 105.

The system 110 can identify a rule set that corresponds to cash withdrawals. Using the rule set and the context factors 115, the system 110 can dynamically adjust the level of security needed to authenticate the person 105.

In some implementations, the rule set specifies context factors 115 that include a first geographic location and timing of the previous transaction requested by a person, and that describe a second geographic location and timing of the current transaction being requested by the person. As described below, transaction information for the previous transaction is compared with transaction information for the current transaction and, based on the results of the comparison, the system determines a mode of authentication, e.g., face recognition, and a sensitivity for the mode of authentication.

The system can determine values for the context factors 115, as described above. Once values for the context factors 115 have been determined, the system 110 evaluates the context factors 115 using the evaluation criteria that is specified in the rule set.

In some implementations, the evaluation criteria includes determining whether the first geographic location in which the previous transaction occurred is the same as the second geographic location in which the current transaction is occurring. If the first and second geographic locations are the same, the evaluation criteria specifies that the person requesting the transaction be authenticated using a face recognition mode of authentication.

If the first and second geographic locations are different, and the second geographic location is determined to be reachable from the first geographic location based on a time difference of the timing of the previous transaction and the timing of the current transaction, then the rule set specifies that the person be authenticated using a face recognition mode of authentication.

However, if the first and second geographic locations are different, and the second geographic location is determined to be unreachable from the first geographic location based on a time difference of the timing of the previous transaction and the timing of the current transaction, then the rule set specifies that the person should be authenticated using a face recognition mode of authentication and a fingerprint recognition mode of authentication. In some implementations, the rule set specifies that a watch list identification be performed, for example, using the cloud service 350, to determine whether the user is described in one or more watch lists indicating that the user should not be authenticated.

Based on the evaluation, the system 110 can dynamically adjust the level of authentication needed for performing the cash withdrawal transaction. In FIG. 1, the system 110 determines, based on the evaluation of the context factors 115, that the person 105 should be authenticated using a face recognition mode of authentication 120.

Also shown in FIG. 1 is process 150 in which a person 155 is interacting with a financial transaction system 160, e.g., an automated teller machine (ATM), to request one or more fraudulent transactions, e.g., a cash withdrawal. The financial transaction system 160 is configured to operate in the same manner as the financial transaction system 110, as described above.

In FIG. 1, the person 155 is attempting to request a cash withdrawal transaction from the system 160 while impersonating the person 105. The system 160 determines values for context factors 165 based on a rule set. The system determines that the person 155 interacting with the system 110 is located in Kolkata, India. The system 160 also determines that the timing of the transaction request, e.g., Tuesday at 10 pm, is on the same day as the previously submitted transaction request that was submitted by the person 105, as described in process 100. Additionally, the system 160 communicates with the cloud service 180 to determine a timing of the previous transaction request, e.g., Tuesday at 9 pm, and a geographic location of the previous transaction, i.e., Bangalore, India.

Applying the evaluation criteria specified in the rule set described above, the system 160 determines that a first geographic location in which the previous transaction occurred, i.e., Bangalore, is different from the second geographic location in which the current transaction is occurring, i.e., Kolkata. The system 160 then determines whether the second geographic location, i.e., Kolkata, is reachable from the first geographic location, i.e., Bangalore, within a travel time that accords with the difference in time between the previous transaction and the current transaction.

In some implementations, the system 160 stores typical travel times for traveling from a first geographic location to a second geographic location. In such implementations, the system 160 determines whether the time difference between the timing of the previous transaction, i.e., Tuesday at 9 pm, and the timing of the current transaction, i.e., Tuesday at 10 pm, is within the typical travel time for traveling from Bangalore to Kolkata.

In FIG. 1, the system 160 determines, based on an evaluation of the time difference and the typical travel time, that the second geographic location is unreachable from the first geographic location. Thus, based on the evaluation criteria, the system 160 selects an authentication method 170 that dynamically increases the level of security for authenticating the person 155 by requiring the person 155 to satisfy a face recognition mode of authentication and a fingerprint recognition mode of authentication, each mode determining whether the person's 155 face and fingerprints match those stored for the account used in the cash withdrawal.

The system 160 determines, based on the results of the face recognition mode of authentication and the fingerprint recognition mode of authentication, that the person 155 is not authorized to make withdrawals against the account. In some implementations, upon determining fraudulent activity, the system 160 reports the fraudulent activity to the cloud service 180 and/or the person 105 and prevents further access to the person's 105 financial account.

Figure 2:
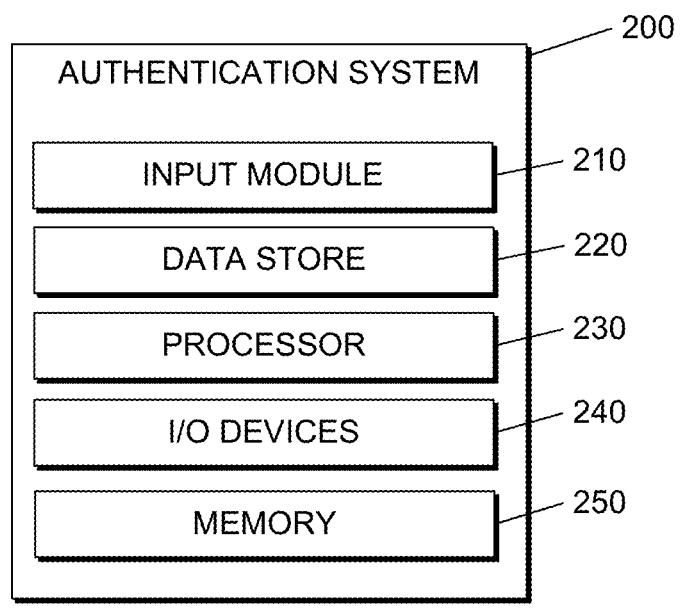
FIGS. 2, 3, and 10 are diagrams of exemplary systems.

FIG. 2 illustrates an exemplary authentication system 200. The system 200 includes an input module 210, a data store 220, one or more processors 230, one or more I/O (Input/Output) devices 240, and memory 250. The input module 210 may be used to input any type of information used in enrolling and verifying biometric data. For example, the input module 210 may be used to receive new authentication (e.g., biometric) data to enroll in a database or receive sample authentication (e.g., biometric) data to verify against authentication reference (e.g., biometric) data stored in a database. In some implementations, data from the input module 210 is stored in the data store 220. The data included in the data store 220 may include, for example, any type of authentication (e.g., biometric) data (e.g., images of irises, fingerprints, voice, faces, etc.). The system 200 can also include or can communicate with one or more internal sensor devices for capturing local context information, e.g., a GPS sensor for determining a geographic position, a light sensor for determining a luminosity level in a user's environment, and accelerometers. The system 200 can also communicate with one or more external sensor devices that capture global context information, as described below.

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3:
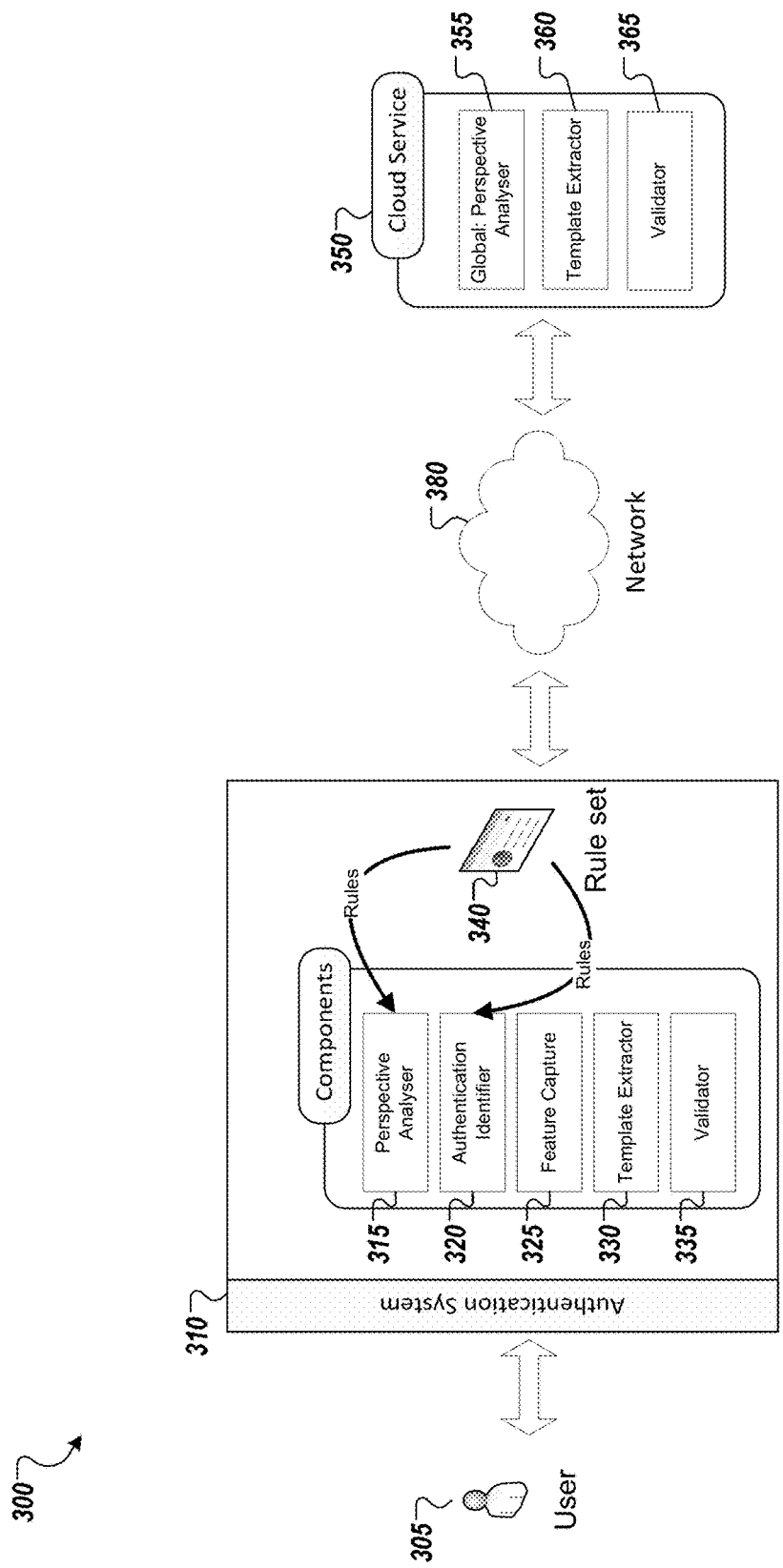

FIG. 3 illustrates an exemplary system 300 that may execute implementations of the present disclosure. The system 300 includes an authentication system 310 and a cloud service 350.

The authentication system 310 includes a perspective analyzer 315, an authentication identifier 320, a feature capturer 325, a template extractor 330, a validator 335, and one or more rule sets 340. The authentication system 310 can be implemented as a standalone server or in a mobile device, e.g., mobile phone, tablet, or any other handheld device. The authentication system 310 can include some or all of the components in the system 200, as described in reference to FIG. 2.

Further, the authentication system 310 can also include or can communicate with one or more devices that capture biometric data, e.g., images and voice data. The one or more devices may include iris scanners, cameras, fingerprint scanners, hand scanners, microphones, or any other type of device capable of capturing biometric data. The authentication system 310 can also include or can communicate with one or more internal sensor devices, e.g., a GPS sensor for determining a geographic position, a light sensor for determining a luminosity level in a user's environment, and accelerometers and/or external sensor devices, e.g., external sensors that provide sensor data to the cloud service 350. Based on data collected from the internal and/or external sensor devices, the authentication system 310 can determine local and global context factors described below, to determine parameters for authenticating a user.

The perspective analyzer 315 is configured to determine context factors, e.g., the local context factors described above, based on one or more rule sets 340. When determining context factors, the perspective analyzer 315 can use the one or more sensor devices, as described above. Thus, the perspective analyzer 315 determines a perspective for a given context. For example, for a particular transaction, the perspective analyzer 315 can determine a location at which the transaction is being performed, the type of transaction, and how often that particular transaction has been performed by a particular user and/or from that location. The perspective analyzer 315 can also communicate with the cloud service 350 to obtain global context factors from a global perspective analyzer 355, as described below.

The authentication identifier 320 is configured to determine, based on the one or more rule sets 340, one or more parameters to be used for authenticating a user, as described above. The authentication identifier 320 can determine the one or more parameters by evaluating context factors specified by the one or more rule sets 340 using evaluation criteria that is specified by the one or more rule sets 340.

The feature capturer 325 is configured to capture one or more biometric features, e.g., facial features, voice, fingerprints, based on one or more parameters that are determined by the authentication identifier 320. The biometric features can be captured using the one or more devices for capturing biometric data, as described above.

The template extractor 330 is configured to extract relevant data from the biometric features that are captured by the feature capturer 325. In some implementations, data to be extracted from the captured biometric features is specified in the one or more rule sets 340. In some implementations, template extraction is performed using a mobile device. Template extraction also may be performed by the cloud service 350. For example, a mobile device can communicate biometric data to the cloud service 350 and the cloud service 350 can use the template extractor 360 to perform the extraction, as described below.

The validator 335 is configured to authenticate a person by evaluating the biometric features captured by the feature capturer 325. The validator 335 can authenticate biometric features using one or more conventional biometric processes. For example, the validator 335 can use various biometric processes to generate respective biometric scores for each of the biometric features being evaluated. The system 310 can compare the generated biometric scores to the user's biometric data stored in a database, as described in reference to FIG. 2. In some implementations, biometric features are authenticated using the cloud service 350. Depending on the implementation, the system can determine a combined biometric score by combining independent biometric scores that each correspond to a particular biometric feature. The system can compare the combined biometric score to a threshold biometric score specified by a rule set to determine whether a user is authenticated. Alternatively, the system can compare each independent biometric score that corresponds to a particular biometric feature to a respective threshold value specified by a rule set to determine whether a user is authenticated.

In some implementations, the authentication system 310 communicates with the cloud service 350 over a network 380, e.g., the Internet. The cloud service 350 includes a global perspective analyzer 355, a template extractor 360, and a validator 365.

The division of processing, e.g., template extraction or validation, between the mobile device and the cloud service 350 can be adjusted. In some implementations, the processing capabilities, e.g., CPU, memory, etc., of the mobile device are evaluated when determining how much processing should be performed by the cloud service 350. For example, more processing can be performed using the mobile device if the mobile device has high processing capabilities. In some implementations, a rule set is configured to specify, for certain types of context, that user authentication must be done in the cloud. For example, if many cases of fraud have been detected in a certain geographic region and it is understood that authentications made using one or more mobile devices have been compromised, then the rule set can specify that authentication should be done using the cloud service 350.

The global perspective analyzer 355 is configured to determine global context factors. Global context factors can include a history of transactions, e.g., banking transactions, of a person or multiple people throughout the system 300 types of the transactions, timings of the transactions, monetary amounts of the transactions, geographic locations of the transactions. Global context factors can also include counts of transactions, e.g., legitimate transactions or fraudulent transactions, made in a particular geographic region. Geographic regions can be defined using varying levels of granularity, e.g., zip code, city, state, country, or continent.

In some implementations, the global perspective analyzer 355 is configured to update rule sets based on an evaluation of one or more global context factors. For example, if the number of fraudulent cash withdrawal transaction attempts in a particular geographic region is greater than a threshold number of transactions, e.g., 20, the global perspective analyzer 355 can trigger a rule set update to increase the level of authentication for cash withdrawal transactions in the particular geographic region. Depending on the implementation, the level of authentication can be increased by requiring additional modes of authentication or by increasing the threshold sensitivity for satisfying the existing modes of authentication.

Figure 4:
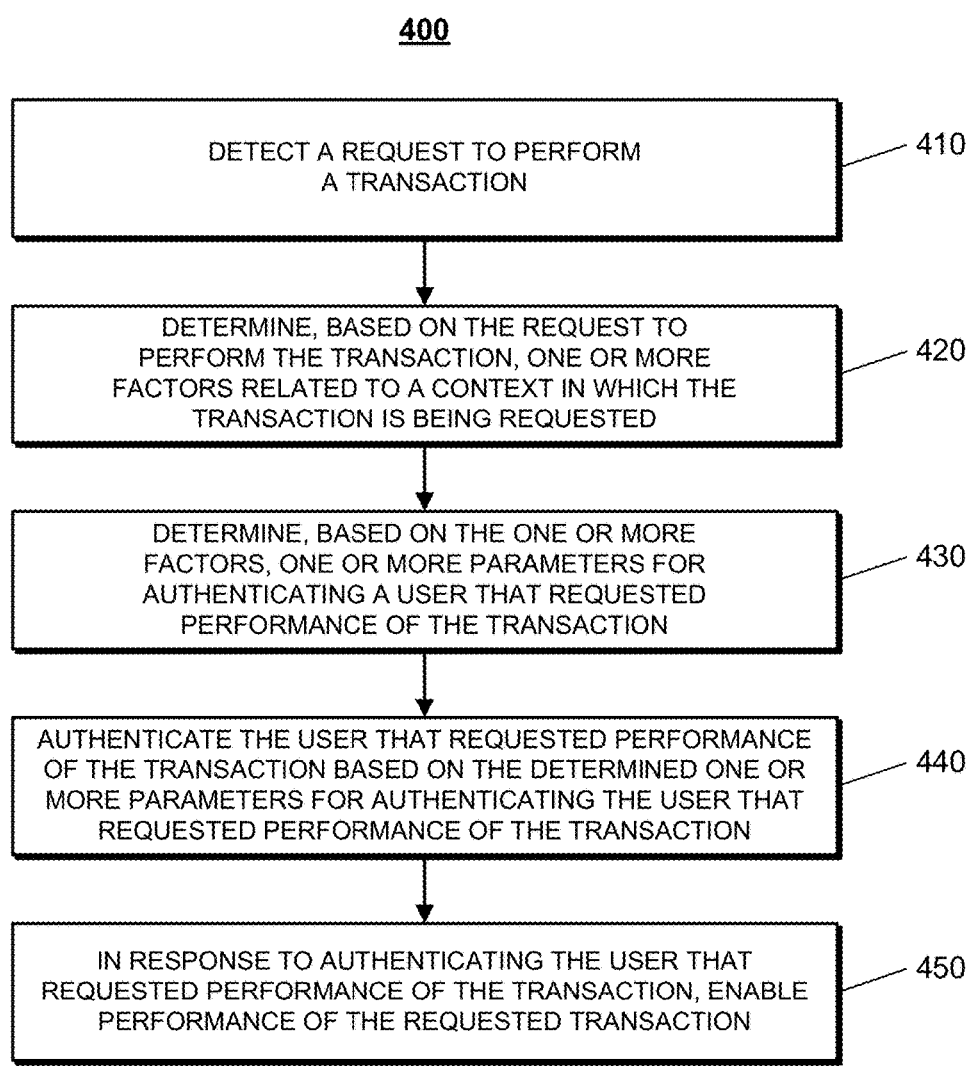
FIG. 4 illustrates an exemplary process for dynamically adjusting a method of authenticating a user.

FIG. 4 illustrates an exemplary process 400 for dynamically adjusting a method of authenticating a user. The operations of the process 400 are described generally as being performed by the system 310. In some implementations, operations of the process 400 may be performed by one or more processors included in one or more electronic devices.

The system 310 detects a request to perform a transaction (410). For example, the request to perform the transaction can be initiated by a user interacting with the system 310, as described above.

The system 310 determines, based on the request to perform the transaction, one or more factors related to a context in which the transaction is being requested (420). The system 310 can determine the one or more factors based on a rule set corresponding to the requested transaction, as described above. For example, the system 310 can communicate with one or more internal and/or external sensor devices to capture data describing the context in which the transaction is being requested.

The system 310 determines, based on the one or more factors, one or more parameters for authenticating a user that requested performance of the transaction (430). As described above, the system 310 can determine the one or more parameters based on an evaluation of the one or more factors related to a context in which the transaction is being requested. The one or more factors can be evaluated using evaluation criteria provided by the rule set corresponding to the requested transaction. Based on the results of the evaluation, the rule set can specify one or more parameters to be used for authenticating the user that requested performance of the transaction.

The parameters can be modes of authentication and/or sensitivities for the modes of authentication, as described above.

The system 310 authenticates the user that requested performance of the transaction based on the determined one or more parameters for authenticating the user that requested performance of the transaction (440). For example, the system 310 can verify the user's biometric data against biometric data stored in a database, as described above in reference to FIG. 2.

In some implementations, the system 310 can adjust the thresholds for verifying the user's biometric data against biometric data stored in the database based on the sensitivities provided by the rule set, as described below.

In response to authenticating the user that requested performance of the transaction, the system 310 enables performance of the requested transaction (450). For example, the system 310 an enable performance of a banking transaction, e.g., cash withdrawal, in response to authentication the user that requested performance of the transaction.

Figure 5:
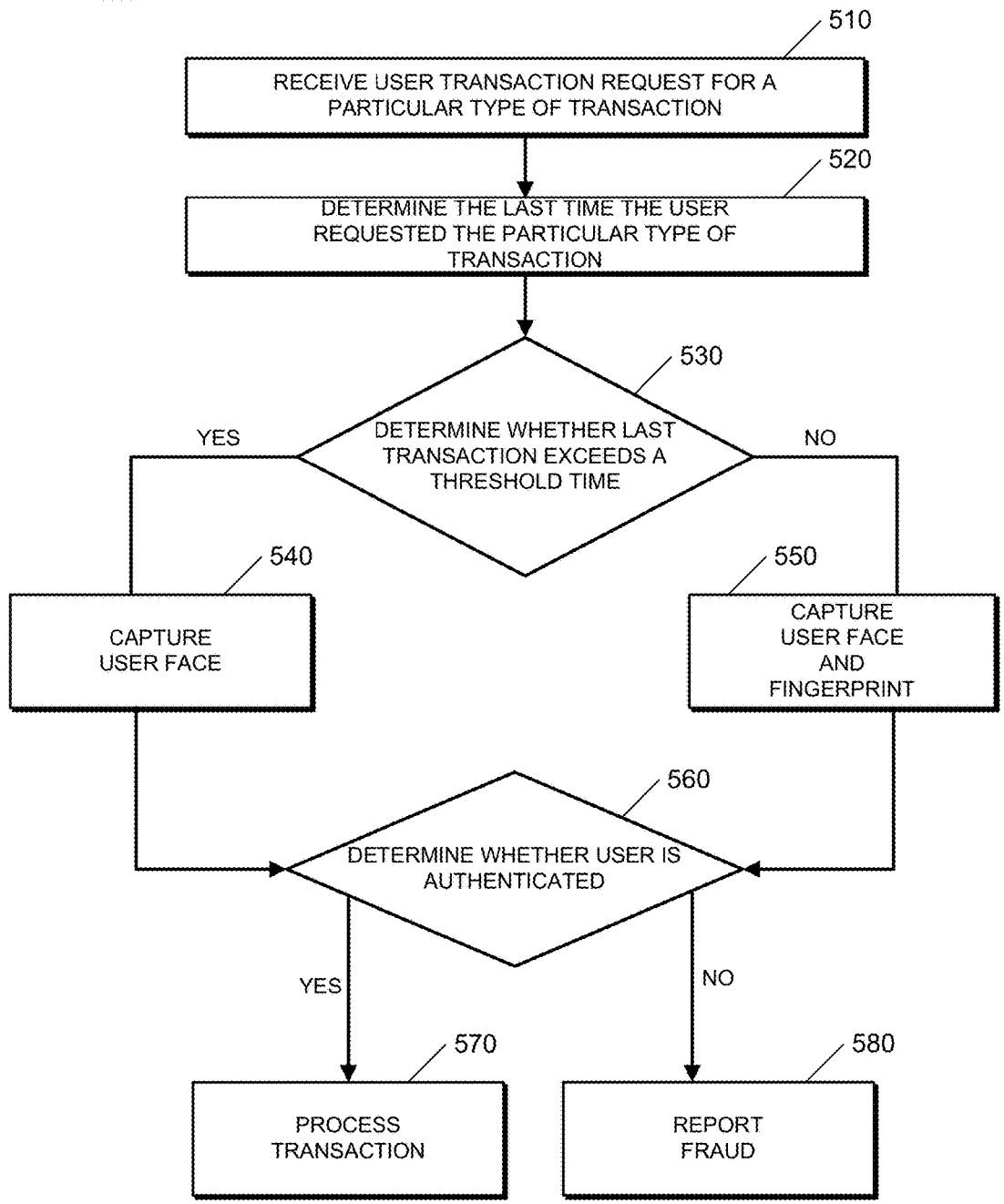
FIG. 5 illustrates an exemplary process for dynamically adjusting a method of authenticating based on a transaction time context factor.

FIG. 5 illustrates an exemplary process 500 for dynamically adjusting a method of authenticating based on a transaction time context factor. The operations of the process 500 are described generally as being performed by the system 310. In some implementations, operations of the process 500 may be performed by one or more processors included in one or more electronic devices.

The system 310 receives a user transaction request for a particular type of transaction (510). For example, the system 310 receives the user transaction request through a system or a mobile device. In this example, the user transaction request is for a cash withdrawal. However, the requested transaction can be any type of transaction for which a user is authenticated. In some implementations, the transaction is a bank deposit or monetary transfer to a different financial institution or a different financial account.

Based on the cash withdrawal transaction request, the system 310 identifies a rule set associated with cash withdrawal transactions. In this example, the rule set for cash withdrawals specifies as a context factor the last time the user requested the particular type of transaction, e.g., a cash withdrawal. The rule set also specifies evaluation criteria for evaluating the context factor. In this example, the evaluation criteria specifies a threshold time, e.g., 20 minutes, within which repeat transactions of the particular type of transaction are permitted. Thus, in this example, a second cash withdrawal is not permitted if the second cash withdrawal was within 20 minutes of the first cash withdrawal. The rule set also specifies parameters, e.g., modes of authentication and corresponding sensitivities, to be used depending on the evaluation of the context factor.

In this example, the system 310 may include or communicate with one or more devices that capture biometric images. The one or more devices may include iris scanners, cameras, fingerprint scanners, hand scanners, or any other type of device capable of capturing a biometric image. The system 310 may access the output of any of the one or more devices as the biometric image, in a traditional image format, such as bmp, jpeg, tiff, png, etc.

The system 310 determines the last time the user requested the particular type of transaction (520). For example, the system 310 can communicate with the cloud service 350 to determine the last time the user requested the particular type of transaction. In this example, since the user transaction request is requesting a cash withdrawal, the system 310 can determine the last time the user requested a cash withdrawal. Depending on the implementation, the system 310 can determine the last time the user requested the particular transaction from any financial institution, from a particular financial institution, or from a particular financial account.

The system 310 determines whether the last time the user requested the particular type of transaction exceeds a threshold time (530). For example, the system 310 can determine whether the time difference between the timing of the last time the user previously requested a cash withdrawal and the timing of the current cash withdrawal transaction exceeds 20 minutes. Threshold times can be specified in rule sets, as described above.

Based on a determination that the last transaction exceeds the threshold time, the system 310 captures the user's face (540). As described above, the parameters, e.g., modes of authentication and corresponding sensitivities, are provided by the rule set based on the results of an evaluation of the context factor. In this example, the rule set specifies that a face recognition mode of authentication should be used if the time difference between the timing of the last time the user previously requested a cash withdrawal and the timing of the current cash withdrawal transaction exceeds the threshold time.

The system 310 can obtain measurements of features, e.g., facial features, voice, fingerprints, using, for example, one or more software development kits (SDK) that implement processes for measuring features. For example, for a facial image, the system 310 can obtain measurements of estimated age, estimated gender, chin and crown position, ear position, deviation from frontal pose, eye gaze frontal, eye aperture, eye tined, eye distance, estimated presence of eye glasses, face height, length of head, width of head, mouth opening, number of faces detected, and pose angle roll. The system 310 can also obtain measurements of other characteristics that are present in the image, including a measurement of hot spots, background uniformity, deviation from uniform lighting, average image exposure, gray scale image density, image sharpness, and average luminosity.

The types of characteristics listed above are provided as examples. In particular, the techniques described in this specification can be applied to any characteristic that can be measured in an image.

The system 310 determines whether the user is authenticated based on the facial image (560). For example, the system 310 can determine whether the user is authenticated using the validator 335, as described above.

Based on a determination that the user is authenticated, the system 310 processes the requested transaction (570). In this example, the system 310 processes the requested cash withdrawal.

Based on a determination that the user is not authenticated, the system 310 reports the fraudulent activity (580). In some implementations, upon determining fraudulent activity, the system 310 reports the fraudulent activity to the cloud service 350 and/or the user and prevents further access to the user's financial account.

Based on a determination that the last transaction does not exceed the threshold time, the system 310 captures the user's face and fingerprint (550). As described above, the parameters, e.g., modes of authentication, are provided by the rule set based on an evaluation of the context factor. In this example, the rule set specifies that a face recognition mode of authentication and a fingerprint mode of authentication should be used if the time difference between the timing of the last time the user previously requested a cash withdrawal and the timing of the current cash withdrawal transaction does not exceed the threshold time.

The system 310 can obtain measurements of features, e.g., facial features, voice, fingerprints, using, for example, one or more software development kits (SDK) that implement processes for measuring features. For example, for a facial image, the system 310 can obtain measurements of estimated age, estimated gender, chin and crown position, ear position, deviation from frontal pose, eye gaze frontal, eye aperture, eye tined, eye distance, estimated presence of eye glasses, face height, length of head, width of head, mouth opening, number of faces detected, and pose angle roll. The system 310 can also obtain measurements of other characteristics that are present in the image, including a measurement of hot spots, background uniformity, deviation from uniform lighting, average image exposure, gray scale image density, image sharpness, and average luminosity.

The types of characteristics listed above are provided as examples. In particular, the techniques described in this specification can be applied to any characteristic that can be measured in an image including, for example, fingerprints.

The system 310 determines whether the user is authenticated based on a combination of the facial image and the fingerprint captured (560). For example, the system 310 can determine whether the user is authenticated using the validator 335, as described above.

Based on a determination that the user is authenticated, the system processes the requested transaction, as described above (570).

Based on a determination that the user is not authenticated, the system reports the fraudulent activity, as described above (580).

Figure 6:
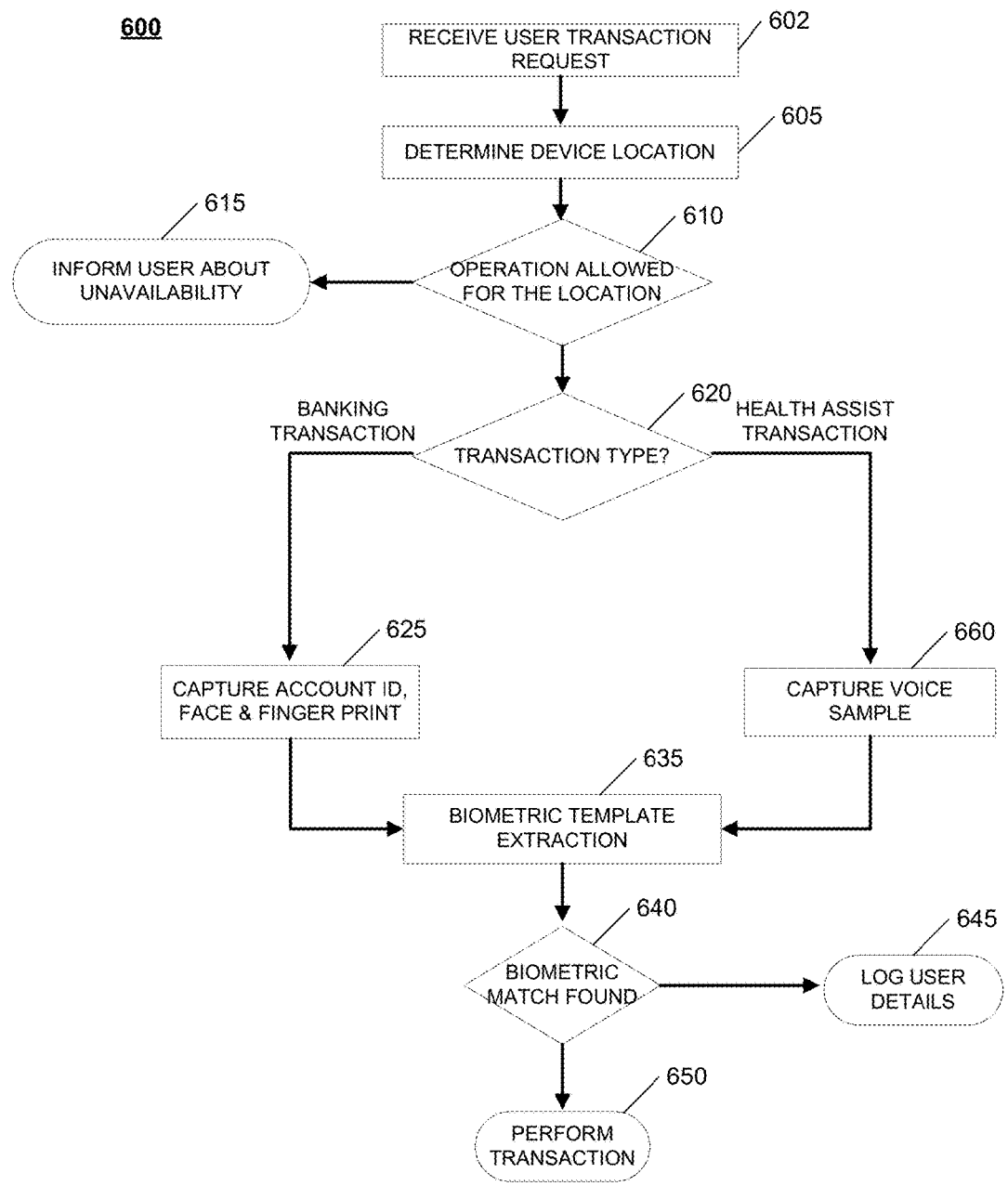
FIG. 6 illustrates an exemplary process for dynamically adjusting a method of authenticating based on a transaction type.

FIG. 6 illustrates an exemplary process 600 for dynamically adjusting a method of authenticating based on a transaction type. The operations of the process 600 are described generally as being performed by the system 310. In some implementations, operations of the process 600 may be performed by one or more processors included in one or more electronic devices.

The system 310 receives a user transaction request (602). In this example, the system 310 is implemented on a mobile device, e.g., a mobile phone, tablet, or another type of handheld device. The system 310 can receive the user transaction request through the mobile device.

Based on the user transaction request, the system 310 identifies a rule set that corresponds to the type of transaction requested. For example, if the user is requesting a banking transaction, the system 310 can identify a rule set corresponding to banking transactions. Similarly, if the user is requesting a health assist transaction, the system 310 can identify a rule set corresponding to health assist transactions.

The system 310 optionally determines its location (605). The system 310 can determine its location using one or more geo-location sensors that are installed in the mobile device.

The system 310 determines whether the system 310 can be operated within the determined location (610). For example, the system 310 can be configured to operate within certain geographic regions, e.g., Kolkata, India, and not within other geographic regions, e.g., Bangalore, India. In some implementations, the system 310 is configured to restrict certain transactions within certain geographic regions.

Based on a determination that the system 310 cannot be operated within the determined location, the system 310 notifies the user that the requested transaction is unavailable (615). For example, the system 310 denies the transaction and displays a message indicating that the requested transaction has been denied because operation of the system 310 is not allowed at the determined location. In this example, the system 310 displays a message indicating locations where operation of the system 310 is permitted to enable the user to move to a permissible location and repeat the request for the transaction.

Based on a determination that the system 310 can be operated within the determined location, the system 310 analyzes the type of transaction requested (620). Using the rule sets, the system 310 can dynamically adjust the level of authentication needed based on the type of transaction being requested.

Based on a determination that the type of transaction is a banking transaction, the system 310 authenticates the user by capturing the user's banking account information, face, and fingerprint (625). As described above, the modes of authentication used to authenticate the user are provided in the rule sets corresponding to the particular transaction. In this example, the rule set for banking transactions specifies that the parameters for authenticating a user include account information, face recognition, and fingerprint recognition.

For the banking transaction, the system 310 performs a biometric template extraction on the user's captured facial and fingerprint information (635). For example, the system 310 performs template extraction using the template extractor 330, as described above. In some implementations, template extraction is performed by the cloud service 350.

The system 310 authenticates the user for the banking transaction (640). For example, if the user is requesting the banking transaction, the system 310 can verify the user's biometric data against biometric data stored in a database (see FIG. 2) in association with the user's banking account information.

Based on a determination that a biometric match is not found, the system 310 logs the fraudulent activity (645). For example, the system 310 uses techniques described above with respect to reference numeral 580 to log the fraudulent activity.

Based on a determination that a biometric match is found, the system 310 performs the requested transaction (650). In this example, the system 310 performs the banking transaction.

Returning to operation 620, based on a determination that the type of transaction is a health assist transaction, the system 310 authenticates the user by capturing the user's voice (660). As described above, the modes of authentication used to authenticate the user are provided in the rule sets corresponding to the particular transaction. In this example, the rule set for health assist transactions specifies that the parameters for authenticating a user include voice recognition.

For the health assist transaction, the system 310 performs a biometric template extraction on the user's captured voice information (635). For example, the system 310 performs template extraction using the template extractor 330, as described above. In some implementations, template extraction is performed by the cloud service 350.

The system 310 authenticates the user for the health assist transaction (640). For example, if the user is requesting the health assist transaction, the system 310 can verify the user's voice data against voice data stored in a database, as described above in reference to FIG. 2

Based on a determination that a biometric match is not found, the system 310 logs the fraudulent activity (645). For example, the system 310 uses techniques described above with respect to reference numeral 580 to log the fraudulent activity.

Based on a determination that a biometric match is found, the system 310 performs the requested transaction (650). In this example, the system 310 performs the health assist transaction.

Figure 7:
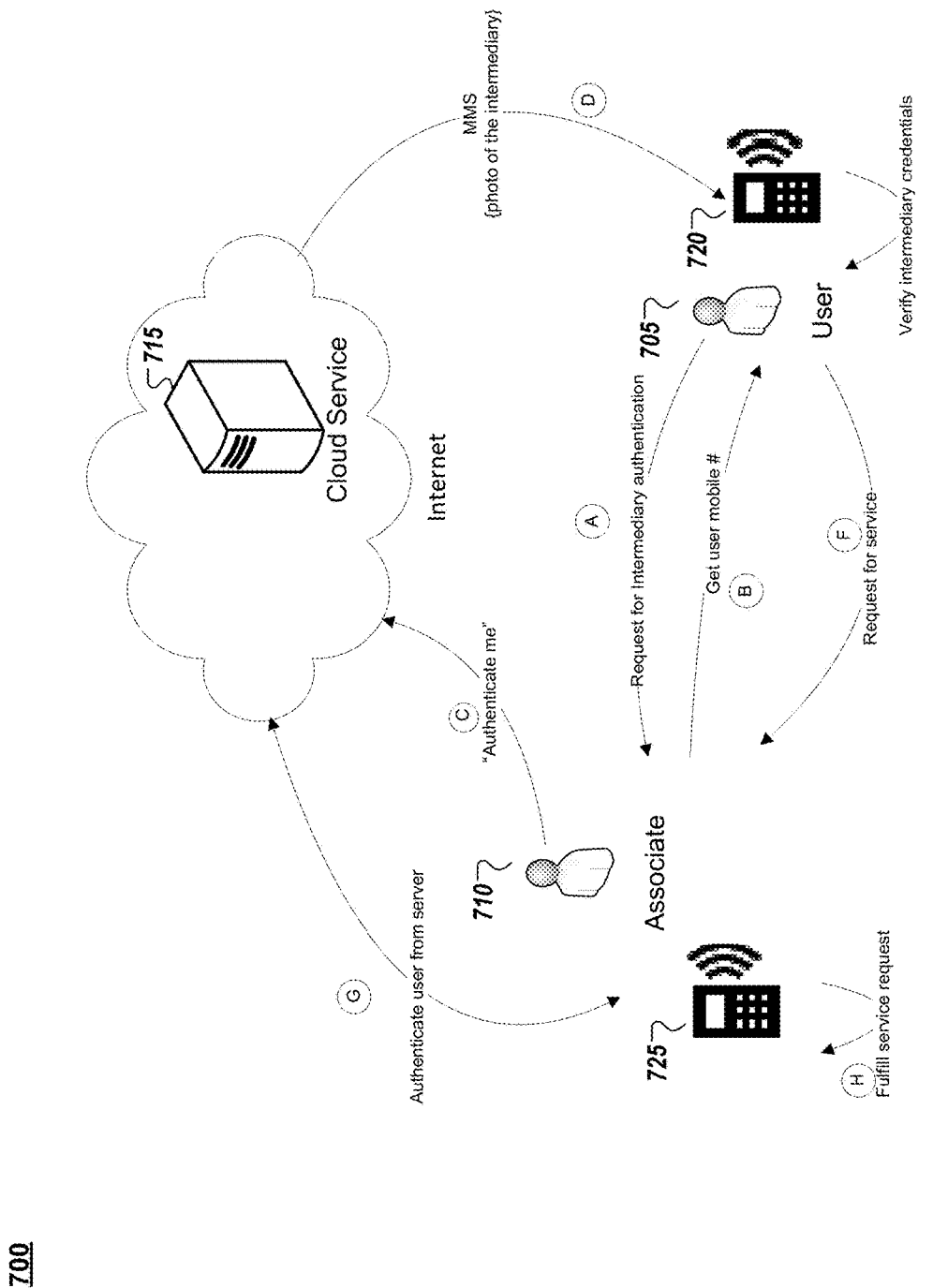
FIG. 7 illustrates an exemplary process for a multiple actor authentication method.

FIG. 7 illustrates an exemplary process 700 for a multiple actor authentication method. FIG. 7 depicts a mutual authentication method to facilitate a transaction between a user 705 and an intermediate service provider associate 710, for example, a bank employee. In FIG. 7, the user 705 is conducting a banking transaction with the associate 710. However, before the transaction can be conducted, the user 705 and associate 710 both have an interest in authenticating each other to ensure that the user is authorized to conduct the banking transaction and that the associate 710 actually works for the bank.

Referring to FIG. 7, during state (A), the user 705 requests authentication of the associate 710. In response to the user's request, during state (B), the associate 710 obtains, from the user 705, the user's 710 mobile phone number.

During state (C), the associate 710 communicates a request to a cloud service 715 asking the cloud service 715 to authenticate the associate 710 to the user 705. When sending the request, the associate 710 also provides the cloud service 715 with the user's 705 mobile phone number that was received during state (B). The cloud service 715 can be the cloud service 350 that was described in reference to FIG. 3.

During state (D), the cloud service 715 communicates data describing the associate 710, e.g., a description or digital photograph of the associate 710, to the user's 705 mobile device 720.

During state (E), the user 705 verifies that the associate 710 is the person described in the data communicated by the cloud service 715. Once the user 705 is satisfied with the associate 710's identity, the user 705 can request a transaction with the associate 710 during state (F). In some implementations, the user captures using the mobile device 720, e.g., a camera in the mobile device 720, a biometric sample, e.g., photograph, fingerprint, or voice, of the associate 705 and communicates data describing the biometric sample to the cloud service 715. In such implementations, the cloud service 715 evaluates the biometric sample and authenticates that the associate 710 as a person that is authorized to perform a transaction.

During state (G), the associate 710 can interact with the mobile device 725 to authenticate the user 705 using the cloud service 715. Once the user 705 is authenticated, the associate 710 can process the user's 705 transaction request during state (H). In some implementations, the division of processing between the mobile device 720 and the cloud service 715 is adjusted based on the user's 705 preferences. For example, the user 705 can configure a rule that specifies that the types of processing, e.g., authentication, that should be done using the mobile device 720 or using the cloud service 715. In some implementations, the processing, e.g., authentication, is performed using the cloud service 715 when there has been a history of fraudulent use by the associate 710.

The dynamic authentication system, as described above, can be applied to a multiple actor authentication method to leverage authentication (e.g., biometric recognition) technology and adjust user authentication performed for a transaction based on a context in which a user requested the transaction.

Figure 8:
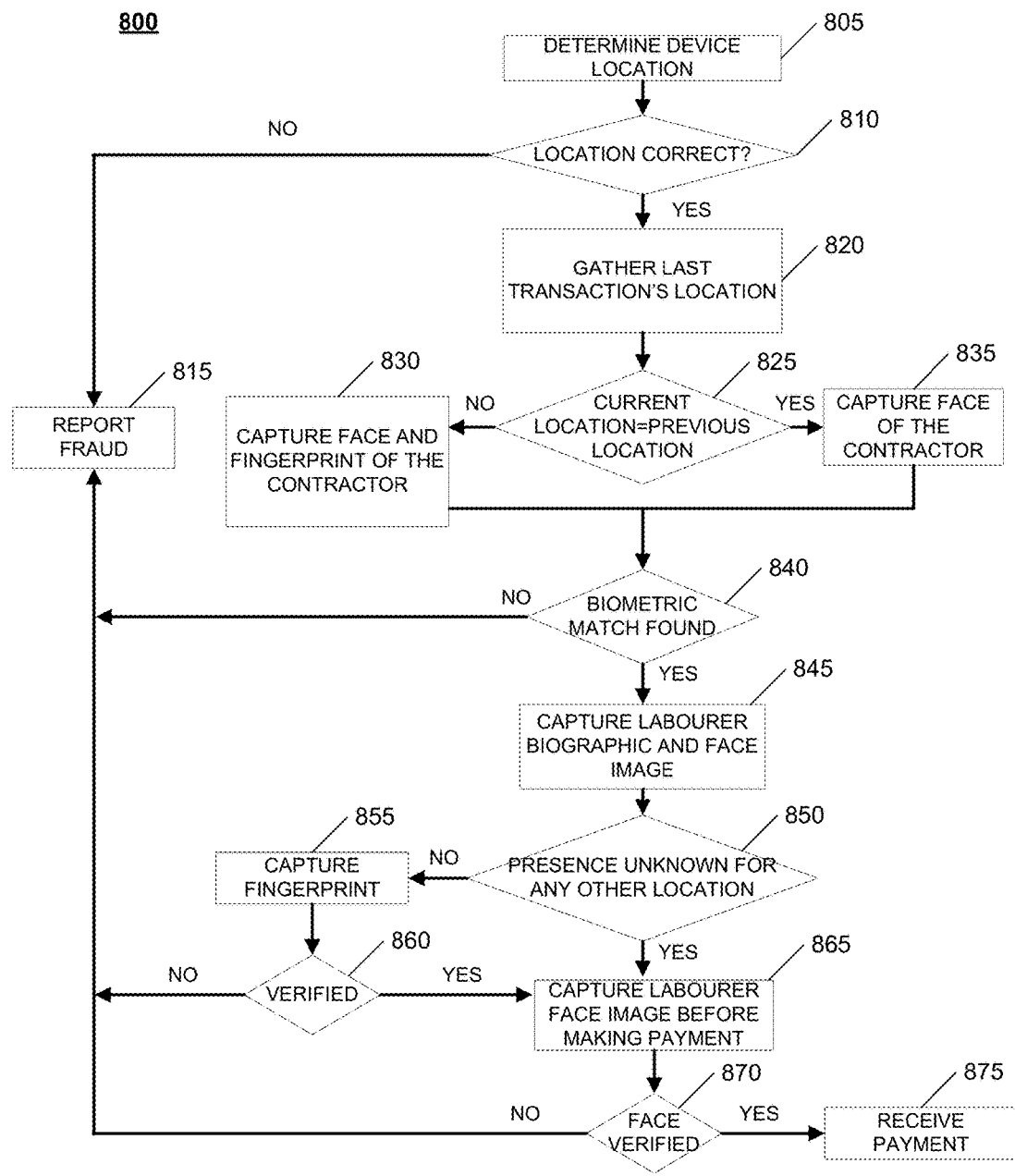
FIG. 8 illustrates an exemplary process for a multiple actor authentication method.

FIG. 8 illustrates an exemplary process 800 for a multiple actor authentication method. The operations of the process 800 are described generally as being performed by the system 310. In some implementations, operations of the process 800 may be performed by one or more processors included in one or more electronic devices.

FIG. 8 describes a scenario in which a laborer is expected to be present at a particular geographic location and to complete a task assigned to the laborer by a contractor. The authentication method is designed to address fraudulent activities that may occur on behalf of the laborer or the contractor. Generally, the process 800 is designed to determine that a contractor is located at a geographic location that the contractor claims to be located at, determine that a laborer is located at a geographic location that the laborer claims to be located at, and determine whether the laborer is paid wages after completing the assigned task.

Depending on the implementation, a higher level of authentication is used if a contractor's mobile device is located at a different geographic location from its previous geographic location. However, a lower level of authentication is used if the mobile device is located at the same geographic location as its previous geographic location. Similarly, a higher level of authentication is used if a laborer's presence is found at a different geographic location. In some implementations, if the geographic location of the contractor's mobile device is different from the geographic location for which the mobile device has been configured to operate within, then the system 310 reports the fraudulent activity. In some implementations, upon determining fraudulent activity, the system 310 reports the fraudulent activity to the cloud service 350 and/or the user and ceases operation.

The system 310 determines a geographic location of a mobile device (805). In this example, the system 310 is implemented on a mobile device, e.g., a mobile phone, tablet, or some handheld device.

The system 310 determines whether the determined geographic location of the mobile device corresponds to a geographic location in which the mobile device is configured to operate (810). For example, the system 310 can be configured to operate within certain geographic regions, e.g., Kolkata, India, and not within other geographic regions, e.g., Bangalore, India. In some implementations, the system 310 is configured to restrict certain transactions within certain geographic regions.

Based on a determination that the geographic location of the mobile device does not correspond to a geographic location in which the mobile device is configured to operate, the system 310 reports the fraudulent activity (815). In some implementations, upon determining fraudulent activity, the system 310 reports the fraudulent activity to the cloud service 350 and/or the user and ceases operation.

Based on a determination that the geographic location of the mobile device corresponds to a geographic location in which the mobile device is configured to operate, the system determines the last geographic location in which a transaction was performed (820). For example, the system can determine the last geographic location in which a transaction was performed based on a transaction history stored in the system 310 or by obtaining a transaction history from the cloud device 350.

The system 310 determines whether the determined geographic location of the mobile device is the same as the last geographic location in which a transaction was performed (825). For example, the system can determine whether the determined geographic location of the mobile device matches the last geographic location in which a transaction was performed.

Based on a determination that the geographic location of the mobile device is not the same as the last geographic location in which a transaction was performed, the system 310 captures the face and a fingerprint of the contractor (830). In this example, the mobile device is configured to operate within both the geographic location of the mobile device and the last geographic location in which a transaction was performed. Depending on the implementation, one or more different biometric features can be used to authenticate the contractor. For example, the system 310 can use the one or more devices to capture biometric data and the one or more internal and/or external sensor devices, as described above. The devices may include iris scanners, cameras, fingerprint scanners, hand scanners, microphones, or any other type of device capable of capturing biometric data.

Based on a determination that the geographic location of the mobile device is the same as the last geographic location in which a transaction was performed, the system 310 captures the face the contractor (835). For example, the system 310 can use the one or more devices to capture biometric data, as described above. The one or more devices may include iris scanners, cameras, fingerprint scanners, hand scanners, microphones, or any other type of device capable of capturing biometric data.

The system 310 authenticates the contractor, as described above (840). For example, the system 310 can verify the biometric data against biometric data stored in a database, as described above in reference to FIG. 2.

Based on a determination that the contractor is not authenticated, the system 310 reports the fraudulent activity (815). In some implementations, upon determining fraudulent activity, the system 310 reports the fraudulent activity to the cloud service 350 and/or the user and ceases operation.

Based on a determination that the contractor is authenticated, the system 310 captures the laborer's biographic data, e.g., name, age, description, etc., and facial image (845). For example, the system 310 can use the one or more devices to capture biometric data, as described above. The one or more devices may include iris scanners, cameras, fingerprint scanners, hand scanners, microphones, or any other type of device capable of capturing biometric data.

The system 310 determines whether the laborer's presence has not been registered at any other geographic location (850). In this example, the system 310 determines whether the laborer has been authenticated at a geographic location that is different from the determined geographic location of the mobile device.

Based on a determination that the laborer's presence has been registered at any other geographic location, the system 310 captures the laborer's fingerprint (855). Depending on the implementation, one or more different biometric features can be used to authenticate the laborer. For example, the system 310 can use the one or more devices to capture biometric data, as described above. The one or more devices may include iris scanners, cameras, fingerprint scanners, hand scanners, microphones, or any other type of device capable of capturing biometric data. In some implementations, based on a determination that the laborer's presence has been registered at any other geographic location, the system 310 reports the laborer as a fraud and ceases the transaction.

The system 310 authenticates the laborer's fingerprint (860). For example, the system 310 can verify the biometric data against biometric data stored in a database, as described above in reference to FIG. 2.

Based on a determination that the laborer's fingerprint is not authenticated, the system 310 reports the fraudulent activity (815). In some implementations, upon determining fraudulent activity, the system 310 reports the fraudulent activity to the cloud service 350 and/or the user and ceases operation.

Based on a determination that the laborer's fingerprint is authenticated and once the laborer has completed the assigned task, the system 310 captures the laborer's facial image before the laborer is paid wages (865). For example, the system 310 can use the one or more devices to capture biometric data, as described above. The one or more devices may include iris scanners, cameras, fingerprint scanners, hand scanners, microphones, or any other type of device capable of capturing biometric data.

The system 310 authenticates the laborer's face (870). For example, the system 310 can verify the biometric data against biometric data stored in a database, as described above in reference to FIG. 2.

Based on a determination that the laborer's face is not authenticated, the system 310 reports the fraudulent activity (815). In some implementations, upon determining fraudulent activity, the system 310 reports the fraudulent activity to the cloud service 350 and/or the user and ceases operation.

Based on a determination that the laborer's face is authenticated, the laborer is paid wages (875). For example, a visual or audio alert can be produced to alert the contractor with a wage amount the laborer should be paid.

Figure 9:
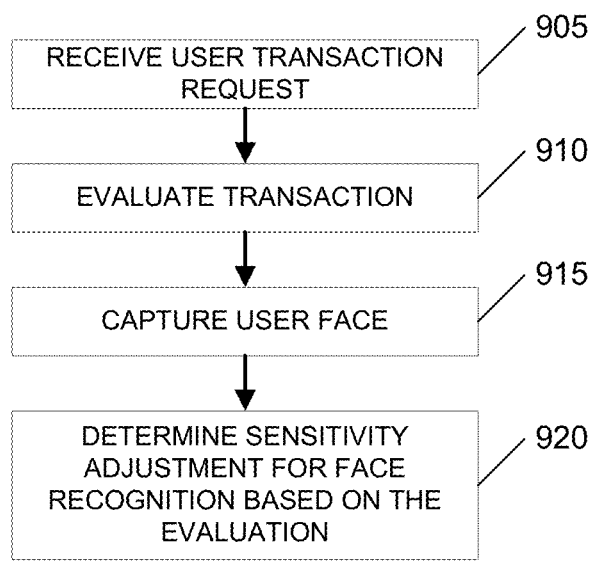
FIG. 9 illustrates an exemplary process for sensitivity adjustment.

FIG. 9 illustrates an exemplary process 900 for sensitivity adjustment. The operations of the process 900 are described generally as being performed by the system 310. In some implementations, operations of the process 900 may be performed by one or more processors included in one or more electronic devices.

The system 310 receives a user transaction request (905). For example, the system 310 receives the user transaction request through a system or a mobile device. In this example, the user transaction request is for a cash withdrawal. However, the requested transaction can be any type of transaction for which a user is authenticated. In some implementations, the transaction is a bank deposit or monetary transfer to a different financial institution or a different financial account.

Based on the cash withdrawal transaction request, the system 310 identifies a rule set associated with cash withdrawal transactions. In this example, the rule set for cash withdrawals specifies as a context factor the last time the user requested the particular type of transaction, e.g., a cash withdrawal. The rule set also specifies biometric face recognition as an authentication parameter for authenticating a user requesting a cash withdrawal together with evaluation criteria for evaluating the context factor.

In this example, the evaluation criteria specify a biometric face recognition threshold, e.g., 90, for authenticating a user performing a cash withdrawal transaction. The evaluation criteria also specifies an adjusted biometric face recognition threshold, e.g., 80, for authenticating the user if the user performs a second cash withdrawal at the same geographic location as the first cash withdrawal and within a specified time period, e.g., within two minutes, of the first cash withdrawal. In some implementations the system 310 dynamically decreases the threshold for a biometric match to reduce the false rejection rate (FRR) to a specified threshold.

The evaluation criteria also specifies another adjusted biometric face recognition threshold, e.g., 100, for authenticating the user if the user performs a second cash withdrawal at a different geographic location as the first cash withdrawal and within a specified time period, e.g., within two minutes, of the first cash withdrawal. In some implementations, the system 310 dynamically increases the threshold for a biometric match to reduce the false acceptance rate (FAR) to a specified threshold.

In this example, the system 310 may include or communicate with one or more devices that capture biometric images. The one or more devices may include iris scanners, cameras, fingerprint scanners, hand scanners, or any other type of device capable of capturing a biometric image. The system 310 may access the output of any of the one or more devices as the biometric image, in a traditional image format, such as bmp, jpeg, tiff, png, etc.

The system 310 evaluates the transaction (910). For example, the system 310 can communicate with one or more internal and/or external sensor devices to determine the time and place of the user's previous cash withdrawal transaction request.

The system 310 captures the user's face (915). As described above, the parameters, e.g., modes of authentication and corresponding sensitivities, are provided by the rule set based on the results of an evaluation of the context factor. In this example, the rule set specifies that a face recognition mode of authentication should be used to authenticate a user requesting a cash withdrawal transaction.

The system 310 can obtain measurements of features, e.g., facial features, voice, fingerprints, using, for example, one or more software development kits (SDK) that implement processes for measuring features. For example, for a facial image, the system 310 can obtain measurements of estimated age, estimated gender, chin and crown position, ear position, deviation from frontal pose, eye gaze frontal, eye aperture, eye tined, eye distance, estimated presence of eye glasses, face height, length of head, width of head, mouth opening, number of faces detected, and pose angle roll. The system 310 can also obtain measurements of other characteristics that are present in the image, including a measurement of hot spots, background uniformity, deviation from uniform lighting, average image exposure, gray scale image density, image sharpness, and average luminosity.

The types of characteristics listed above are provided as examples. In particular, the techniques described in this specification can be applied to any characteristic that can be measured in an image.

The system 310 determines a sensitivity adjustment for face recognition based on the evaluation (920). For example, if the user performs a second cash withdrawal at the same geographic location as the first cash withdrawal and within a specified time period, e.g., within two minutes, of the first cash withdrawal, the system 310 can decrease the biometric face recognition threshold for authenticating the user. Similarly, if the user performs a second cash withdrawal at a different geographic location as the first cash withdrawal and within a specified time period, e.g., within two minutes, of the first cash withdrawal, the system 310 can increase the biometric face recognition threshold for authenticating the user.

The system 310 can adjust sensitivities based on other factors. For example, in some implementations, if a user is requesting a transaction from an indoor location with low ambient illumination, the system 310 can decrease the threshold for authenticating the user using biometric face recognition to reduce the false rejection rate by accommodating for the dim lighting conditions. However, if the user is requesting a transaction from an outdoor location with high ambient illumination, the system 310 can increase the threshold for authenticating the user using biometric face recognition to reduce the false acceptance rate, since illumination is not a problem in this particular context.

Figure 10:
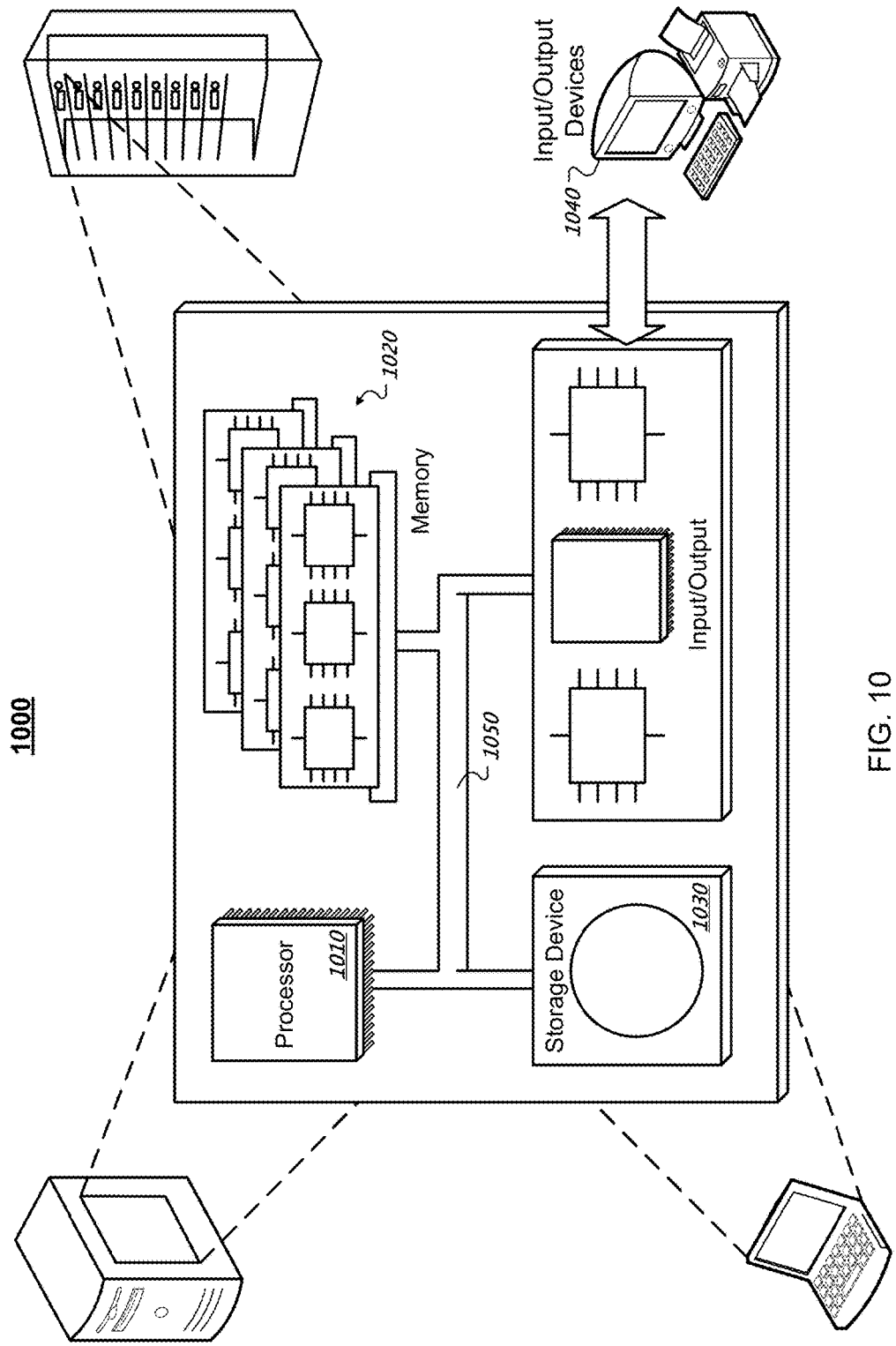

FIG. 10 is a schematic diagram of an example of a generic computer system 1000. The system 1000 can be used for the operations described in association with the processes 400, 500, 600, 700, 800, and 900, according to some implementations. The system 1000 may be included in the system 200 and the system 300.

The system 1000 includes a processor 1010, a memory 1020, a storage device 2230, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. An authentication system comprising:
one or more processors configured to interact with a computer storage medium to perform operations comprising:
determining, based on a request to perform a transaction, one or more context factors related to a context in which the transaction is being requested, the one or more context factors determined based at least partly on data that is captured by one or more sensor devices and communicated to the authentication system by the one or more sensor devices;
applying a rule set to determine, based on the one or more context factors, parameters for authenticating a user that requested performance of the transaction, the parameters including at least one mode of authentication and at least one sensitivity for the at least one mode of authentication, the rule set indicating the at least one mode of authentication and a dynamic adjustment of the at least one sensitivity based at least partly on the one or more context factors;
authenticating the user by receiving, from at least one biometric data capture device in communication with the authentication system, biometric data captured by the at least one biometric data capture device, the biometric data corresponding to the at least one mode of authentication, and determining that the biometric data corresponds to previously collected biometric data for the user within a threshold that is based on the at least one sensitivity that is dynamically adjusted, according to the rule set and based on the one or more context factors, to reduce a false rejection rate or a false acceptance rate for authentication; and
based on successfully authenticating the user, performing the requested transaction.

2. The system of claim 1, wherein the one or more context factors include one or more factors describing a history of transactions of the user that requested performance of the transaction, a type of the transaction, a timing of the transaction, a geographic location of the transaction, or at least one environmental factor related to an ability to authenticate the user using biometric authentication techniques.

3. The system of claim 1, wherein determining the one or more context factors comprises:
determining a type of the transaction;
identifying the rule set that corresponds to the type of the transaction; and
determining, based on the identified rule set, the one or more context factors related to the context in which the transaction is being requested.

4. The system of claim 1, wherein applying the rule set to determine the parameters comprises:
evaluating the one or more context factors against evaluation criteria that specify different levels of authentication to perform in authenticating the transaction depending on the context in which the transaction is being requested; and
determining the parameters for authenticating the user based on evaluating the one or more context factors against the evaluation criteria.

5. The system of claim 4, wherein the one or more context factors include one or more local factors that are specific to the transaction being requested, the operations further comprising:
obtaining one or more global factors related to the context in which the transaction is being requested, the one or more global factors being related to multiple transactions of multiple users that have occurred through the system;
evaluating the one or more global factors against the evaluation criteria; and
determining the parameters for authenticating the user that requested performance of the transaction based on evaluating, against the evaluation criteria, the one or more local factors and the one or more global factors.

6. The system of claim 5, wherein the one or more global factors include a history of transactions that have occurred through the system, timings of the transactions that have occurred through the system, monetary amounts of the transactions that have occurred through the system, or geographic locations of the transactions that have occurred through the system.

7. The system of claim 5, wherein the evaluation criteria specify, based on the one or more local factors and the one or more global factors, the at least one mode of authentication.

8. The system of claim 7, wherein the evaluation criteria specify, based on the one or more local factors and the one or more global factors, the at least one sensitivity.

9. The system of claim 1:
wherein determining, based on the request to perform the transaction, the one or more context factors related to the context in which the transaction is being requested comprises determining the environmental factor that reflects an environment that the user is in based on contextual information received from one or more environmental sensors in the same environment as the user, and
wherein applying the rule set to determine the parameters further comprises determining an impact of the environmental factor on one or more biometric sensors associated with the at least one mode of authentication.

10. The system of claim 1:
wherein the one or more context factors comprise a timing of the request and the geographic location; and
wherein the operations further comprise:
   determining, based on the timing and the geographic location corresponding to a previous request and the timing of the request to perform the transaction, that the geographic location of the request to perform the transaction is unreachable; and
   in response to determining that the geographic location of the request to perform the transaction is unreachable, determining a particular mode of authentication and sensitivity to use.

11. The system of claim 1, wherein authenticating the user comprises:
   receiving the biometric data corresponding to the at least one mode of authentication;
   determining whether the biometric data matches the previously collected biometric data; and
   in response to determining that the biometric data matches the previously collected biometric data, successfully authenticating the user.

12. The system of claim 1, wherein:
the one or more context factors include a time of a previous transaction; and
the rule set includes a rule indicating that face recognition is to be used as a mode of authentication, for the transaction being requested at least a period of time after the time of the previous transaction.

13. The system of claim 1, wherein:
the one or more context factors include a time of a previous transaction; and
the rule set includes a rule indicating that face recognition and fingerprint recognition are to be used as modes of authentication, for the transaction being requested within a period of time after the time of the previous transaction.

14. The system of claim 1, wherein:
the one or more context factors include a time of a previous transaction, a location of the transaction, and a location of the previous transaction; and
the rule set includes a rule indicating that face recognition is to be used as a mode of authentication and indicating a dynamically adjusted face recognition threshold, for the transaction being requested within a period of time after the time of the previous transaction, and for the location of the transaction being same as the location of the previous transaction.

15. The system of claim 1, wherein:
the one or more context factors include a time of a previous transaction, a location of the transaction, and a location of the previous transaction; and
the rule set includes a rule indicating that face recognition is to be used as a mode of authentication and indicating a dynamically adjusted face recognition threshold, for the transaction being requested within a period of time after the time of the previous transaction, and for the location of the transaction being different from the location of the previous transaction.

16. The system of claim 1, wherein:
the one or more context factors include a detected noise level; and
the rule set includes a rule indicating that greater weight is to be given to a face recognition mode of authentication than to a voice recognition mode of authentication, based on the detected noise level.

17. The system of claim 1, wherein:
the one or more context factors include a detected ambient light level; and
the rule set includes a rule indicating that greater weight is to be given to a fingerprint recognition mode of authentication than to a face recognition mode of authentication, based on the detected ambient light level.

18. The system of claim 1, wherein:
the one or more context factors include a detected ambient light level; and
the rule set includes a rule indicating a dynamically adjusted face recognition threshold based on the detected ambient light level.

19. A computer-implemented method performed by at least one processor, the method comprising:
   determining, by the at least one processor, based on the request to perform a transaction, one or more context factors related to a context in which the transaction is being requested, the one or more context factors determined based at least partly on data that is captured by one or more sensor devices and communicated to an authentication system by the one or more sensor devices;
   applying, by the at least one processor, a rule set to determine, based on the one or more factors, parameters for authenticating a user that requested performance of the transaction, the parameters including at least one mode of authentication and at least one sensitivity for the at least one mode of authentication, the rule set indicating the at least one mode of authentication and a dynamic adjustment of the at least one sensitivity based at least partly on the one or more context factors;
   authenticating, by the at least one processor, the user by receiving, from at least one biometric data capture device in communication with the authentication system, biometric data captured by the at least one biometric data capture device, the biometric data corresponding to the at least one mode of authentication, and determining that the biometric data corresponds to previously collected biometric data for the user within a threshold that is based on the at least one sensitivity that is dynamically adjusted, according to the rule set and based on the one or more context factors, to reduce a false rejection rate or a false acceptance rate for authentication; and
   based on successfully authenticating the user, performing, by the at least one processor, the requested transaction.

20. At least one non-transitory computer-readable storage medium encoded with executable instructions that, when executed by at least one processor, cause the at least one processor to perform operations comprising:
   determining, based on a request to perform a transaction, one or more context factors related to a context in which the transaction is being requested, the one or more context factors determined based at least partly on data that is captured by one or more sensor devices and communicated to an authentication system by the one or more sensor devices;
   applying a rule set to determine, based on the one or more context factors, parameters for authenticating a user that requested performance of the transaction, the parameters including at least one mode of authentication and at least one sensitivity for the at least one mode of authentication, the rule set indicating the at least one mode of authentication and a dynamic adjustment of the at least one sensitivity based at least partly on the one or more context factors;

authenticating the user by receiving, from at least one biometric data capture device in communication with the authentication system, biometric data captured by the at least one biometric data capture device, the biometric data corresponding to the at least one mode of authentication, and determining that the biometric data corresponds to previously collected biometric data for the user within a threshold that is based on the at least one sensitivity that is dynamically adjusted, according to the rule set and based on the one or more context factors, to reduce a false rejection rate or a false acceptance rate for authentication; and based on successfully authenticating the user performing the requested transaction.

* * * * *